(12) United States Patent
Lin

(10) Patent No.: US 7,133,279 B2
(45) Date of Patent: Nov. 7, 2006

(54) HOUSING STRUCTURE

(75) Inventor: Chin Cheng Lin, Taipei (TW)

(73) Assignee: Asustek Computer Inc, Taipei (TW)

( * ) Notice: Subject to any disclaimer, the term of this patent is extended or adjusted under 35 U.S.C. 154(b) by 59 days.

(21) Appl. No.: 10/829,363

(22) Filed: Apr. 22, 2004

(65) Prior Publication Data

US 2004/0245006 A1 Dec. 9, 2004

(30) Foreign Application Priority Data

May 7, 2003 (TW) .............................. 92112395 A

(51) Int. Cl.
*G06F 1/16* (2006.01)
*H02G 3/08* (2006.01)

(52) U.S. Cl. .................. 361/679; 710/301; 174/66; 312/223.2

(58) Field of Classification Search ........ 361/679–687, 361/724–727; 710/301; 220/4.23; 174/66; 312/223.2
See application file for complete search history.

(56) References Cited

U.S. PATENT DOCUMENTS

| 3,166,365 | A  | * | 1/1965 | Zeamer et al. ........... 312/208.4 |
| 4,615,464 | A  | * | 10/1986 | Byrns ....................... 220/4.23 |
| 6,247,078 | B1 | * | 6/2001 | Ebert et al. ................. 710/301 |
| 2005/0115734 | A1 | * | 6/2005 | Lim et al. ..................... 174/66 |

FOREIGN PATENT DOCUMENTS

JP 339174 * 7/2001
TW 393016 6/2000

* cited by examiner

*Primary Examiner*—Hung Van Duong
(74) *Attorney, Agent, or Firm*—Birch, Stewart, Kolasch & Birch, LLP

(57) ABSTRACT

A housing structure. The housing structure includes a first case and a second case. The first case includes a first inner wall with an extension plate. The length of the extension plate is h. The second case includes a second inner wall with a rib. A notch is defined between the rib and the second inner wall, and the depth of the notch is h. When the first case is joined with the second case, the extension plate engages the notch.

19 Claims, 18 Drawing Sheets

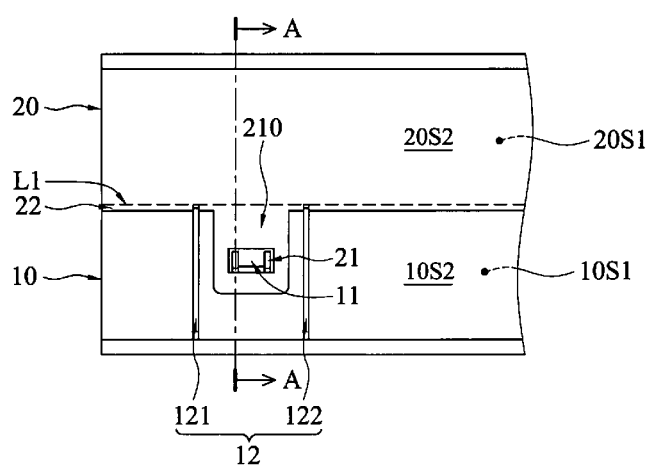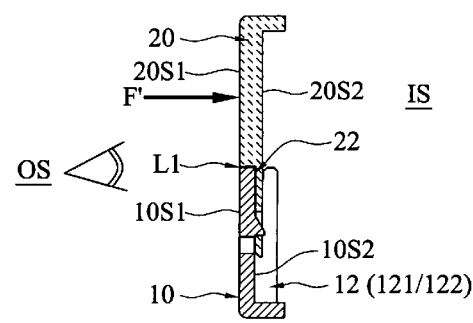
FIG. 6D
FIG. 6E

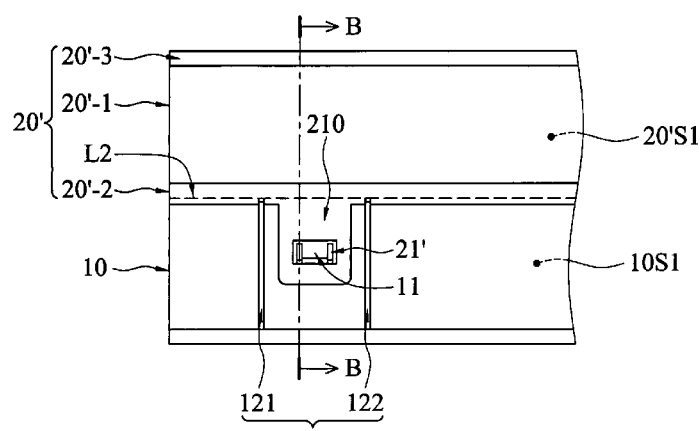
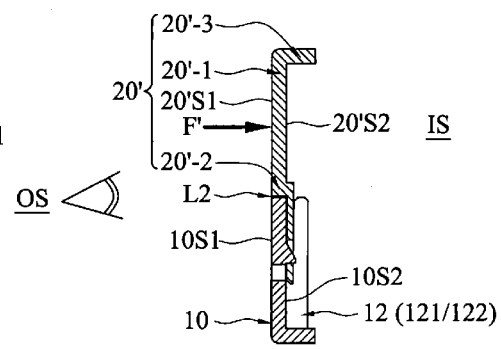
FIG. 8D
FIG. 8E

HOUSING STRUCTURE

This Non-provisional application claims priority under 35 U.S.C. § 119(a) on Patent Application No(s). 092112395 filed in Taiwan on May 7, 2003, the entire contents of which are hereby incorporated by reference.

BACKGROUND OF THE INVENTION

1. Field of the Invention

The invention relates to a housing structure; in particular, the invention relates to a housing structure with a uniform appearance.

2. Description of the Related Art

FIG. 1 is a schematic view of a conventional housing structure B (B1, B2, and B3). The housing structure B includes a lower case H1 and an upper case H2. A space is formed between the lower case H1 and the upper case H2 when they are joined. An object E, such as a hard disc drive, an optical disc drive, or the other electronic device, is received in the space of the housing structure B. A joint region J is formed at a contact point between the lower case H1 and the upper case H2 subsequent to their assembly.

Referring to FIGS. 2A–2C, FIG. 2A is a partial perspective view of the housing structure B1, and is cut away along a line T1—T1 of FIG. 1. FIG. 2B is a partial side view of FIG. 2A, and FIG. 2C is a cross-sectional view along a line X—X of FIG. 2B.

In FIG. 2A, the lower case H1 includes a side wall W1-1 and plural positioning protrusions C-1. The positioning protrusions C-1 are separately disposed on an inner wall of the side wall W1-1, and are separate from each other. The upper case H2 includes a side wall W1-2 and plural positioning plates C-2. The positioning plates C-2 are disposed on an inner wall of the side wall W1-2, and are separate from each other. A positioning hole C-3 is formed in each positioning plates C-2.

When the positioning protrusions C-1 of the lower case H1 are inserted into the positioning holes C-3 of the positioning plates C-2 of the upper case H2, the assembly of the lower case H1 and the upper case H2 is complete. The housing structure B1 is divided into an inner space IS and an outer space OS by the side walls W1-1, W1-2. The object E as shown in FIG. 1 is received in the inner space IS.

FIG. 2B shows a slit J11 presented at the joint region J1 between the side walls W1-1, W1-2. Structures inside the housing structure B1 can be seen from the joint region J1.

FIG. 2D is a schematic view of the housing structure B1 and a force F exerted thereon. When the upper case H2 is subject to the force F, the positioning plate C-2 is partially separated from the positioning protrusion C-1. Thus, the upper case H2 may accidentally separate from the lower case H1.

Referring to FIG. 3A and FIG. 3B, FIG. 3A is a partial perspective view of the housing structure B2, and is cut away along a line T1—T1 of FIG. 1. FIG. 3B is a partial side view of FIG. 3A.

In FIG. 3A, the housing structure B2 includes two side walls W2-1, W2-2 contacting each other. The side wall W2-1 is formed with a step portion M21 at its free end, and the side wall W2-2 is formed with a step portion M22 at its free end. The step portion M21 contacts the step portion M22. A joint region J2 is formed between the side walls W2-1, W2-2.

The housing structure B2 differs from the housing structure B1 in that the side walls W2-1, W2-2 are abutted by the step portions M21, M22. Since other components, such as positioning protrusions C-1 and positioning plates C-2, of housing structure B2 are the same as those of the housing structure B1, their description is omitted.

Referring to FIG. 3C and FIG. 3D, FIG. 3C is a cross-sectional view along a line Y—Y of FIG. 3B. FIG. 3D is a schematic view of the housing structure B2 being subjected to a force F.

As shown in FIG. 3C, since the side walls W2-1, W2-2 of the housing structure B2 are assembled by joining the step portions M21, M22, the structure in the inner space IS of the housing structure B2 cannot be seen via the joint region J2 from the outer space OS. When the side wall W2-2 is subjected to the force F, the side wall W2-2 cannot be positioned by the step portion M21 of the side wall W2-1. Thus, the positioning plate C-2 is partially separated from the positioning protrusion C-1, and the side wall W2-2 may be accidentally separated from the side wall W2-1.

Furthermore, since the step portion M21 of the side wall W2-1 is provided with a non-uniform cross section, a non-uniform appearance K is formed on the outer surface during injection molding as shown in FIG. 3E. Specifically, when the thickness of the product changes abruptly, as shown in FIG. 3F, the non-uniform appearance K is easily formed on the back side of the position where the abrupt change occurred. Thus, the appearance of the product suffers.

Referring to FIG. 4A and FIG. 4B, FIG. 4A is a partial perspective view of the housing structure B3, and is cut away along a line T1—T1 of FIG. 1. FIG. 4B is a partial side view of FIG. 4A.

In FIG. 4A, the housing structure B3 includes two side walls W3-1, W3-2 contacting each other. The side wall W3-1 is formed with a step portion M31 at its free end, and the side wall W3-2 is formed with a step portion M32 at its free end. The step portion M31 contacts the step portion M32. A joint region J3 is formed between the side walls W3-1, W3-2.

The housing structure B3 differs from the housing structure B2 in that the geometric structure of the combination of the step portions M31, M32 is completely reversed from that of the step portions M21, M22. Since the other components, such as the positioning protrusions C-1 and the positioning plates C-2, of the housing structure B3 are the same as those of the housing structure B1, their description is omitted.

Referring to FIG. 4C and FIG. 4D, FIG. 4C is a cross-sectional view along a line Z—Z of FIG. 4B. FIG. 4D is a schematic view of the housing structure B3 and a force F exerted thereon.

As shown in FIG. 4C, since the side walls W3-1, W3-2 of the housing structure B3 are assembled by joining the step portions M31, M32, the structure in the inner space IS of the housing structure B3 cannot be seen via the joint region J3 from the outer space OS. Additionally, the side wall W3-2 cannot be accidentally separated from the side wall W3-1 due to external force exerted by the step portions M31, M32, and the positioning protrusions C-1 and the positioning plates C-2.

However, since the step portion M32 of the side wall W3-2 is provided with a non-uniform cross section, a non-uniform appearance K is formed on the outer surface during injection molding as shown in FIG. 4D. Thus, the appearance of the product suffers.

SUMMARY OF THE INVENTION

In order to address the disadvantages of the aforementioned housing structure, the invention provides a housing structure with a uniform appearance.

Accordingly, the invention provides a housing structure including a first case and a second case. The first case includes a first inner wall with an extension plate. The length of the extension plate is h. The second case includes a second inner wall with a rib. A notch is defined between the rib and the second inner wall, and the depth of the notch is h. When the first case is joined with the second case, the extension plate engages the notch.

In a preferred embodiment, the first inner wall includes an end surface, and the extension plate extends from the end surface.

In another preferred embodiment, the first case further includes a first connecting portion, and the second case further includes a second connecting portion. When the first case is joined with the second case, the first connecting portion is joined with the second connecting portion in a separable manner.

The first connecting portion includes a positioning plate and a hole formed on the positioning plate.

It is understood that the first connecting portion and the extension plate may be integrally formed on the first inner wall, and the second connecting portion and the rib may be integrally formed on the second inner wall.

Furthermore, the first case is substantially provided with a uniform cross section, and the second case is substantially provided with a uniform cross section.

In the invention, the invention provides another housing structure including a first case and a second case. The first case includes a first inner wall with a Z-shaped end surface. An extension plate is formed on the Z-shaped end surface, and the length of the extension plate is h. The second case includes a second inner wall with a rib. A notch is defined between the rib and the second inner wall, and the depth of the notch is h. When the first case is joined with the second case, the extension plate engages the notch.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention and wherein:

FIG. 6D is a partial side view of FIG. 6A;

FIG. 6E is a cross-sectional view along a line A—A of FIG. 6D;

FIG. 8D is a partial side view of FIG. 8A; and

FIG. 8E is a cross-sectional view along a line B—B of FIG. 8D.

DETAILED DESCRIPTION OF THE INVENTION

First Embodiment

Figure 1:
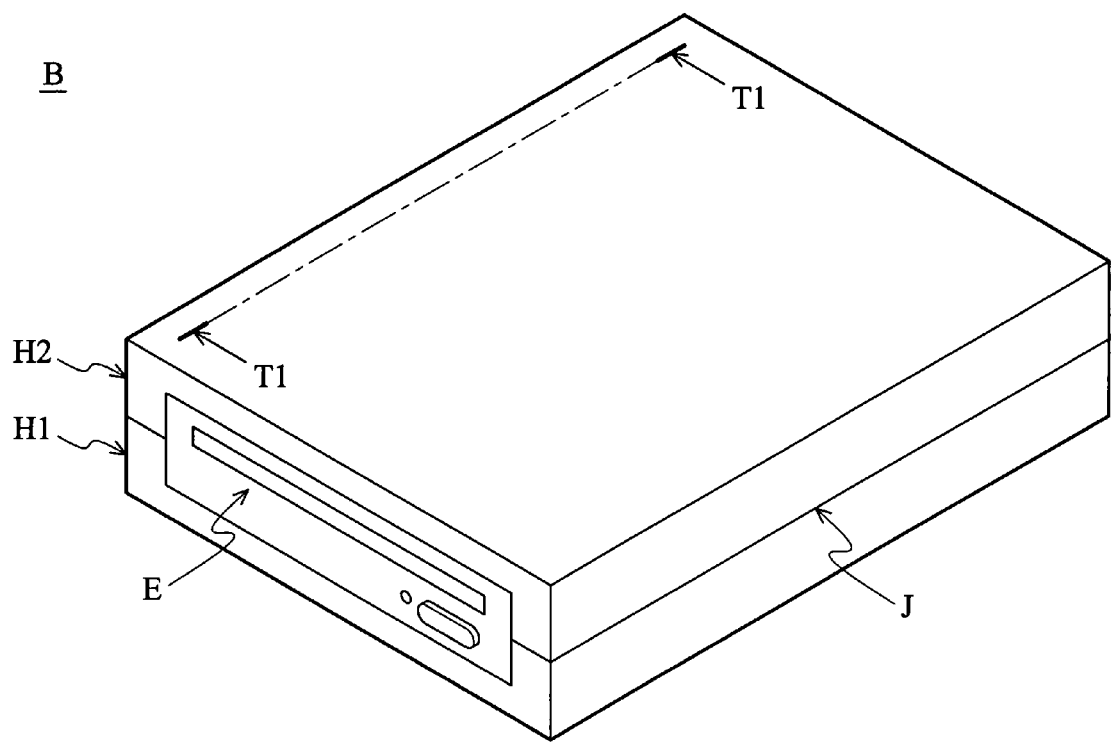
FIG. 1 a perspective view of a conventional housing structure.
Figure 2A:
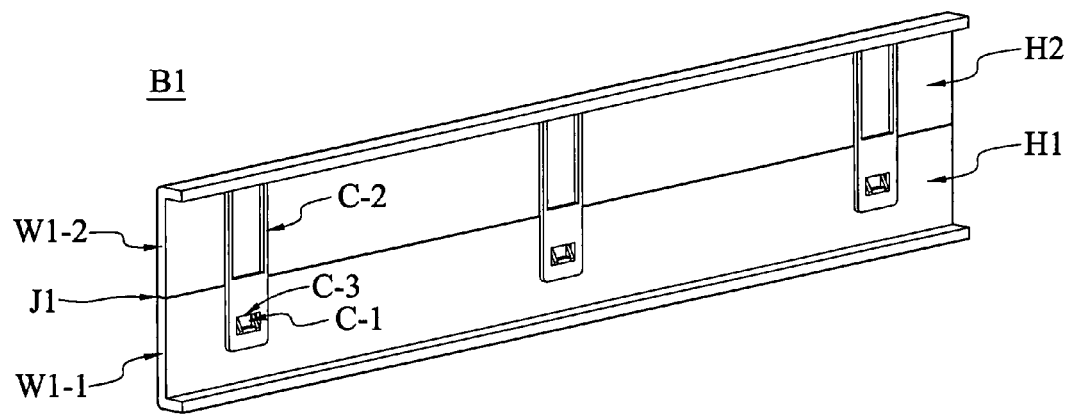
FIG. 2A is a partial perspective view of a conventional housing structure, and is cut away along a line T1—T1 of FIG. 1.
Figure 2B:
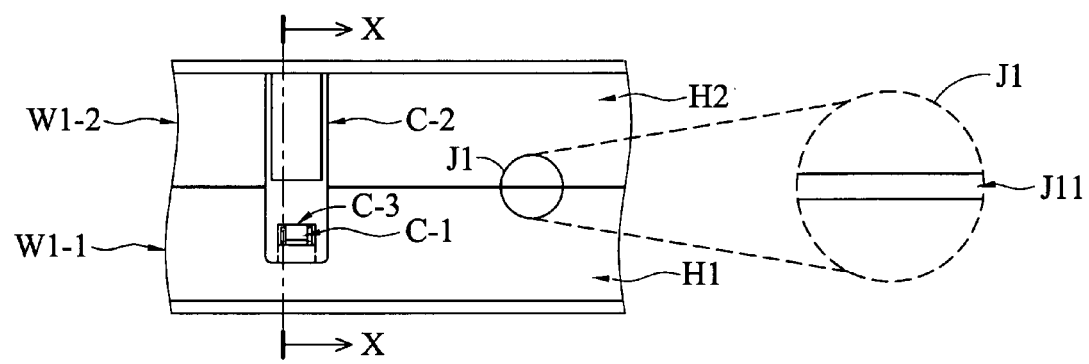
FIG. 2B is a partial side view of FIG. 2A.
Figure 2C:
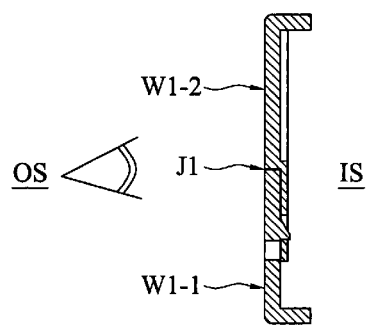
FIG. 2C is a cross-sectional view along a line X—X of FIG. 2B.
Figure 2D:
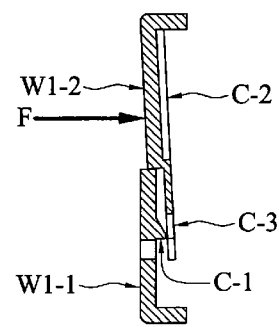
FIG. 2D is a schematic view of the housing structure in FIG. 2D being subjected to a force.
Figure 3A:
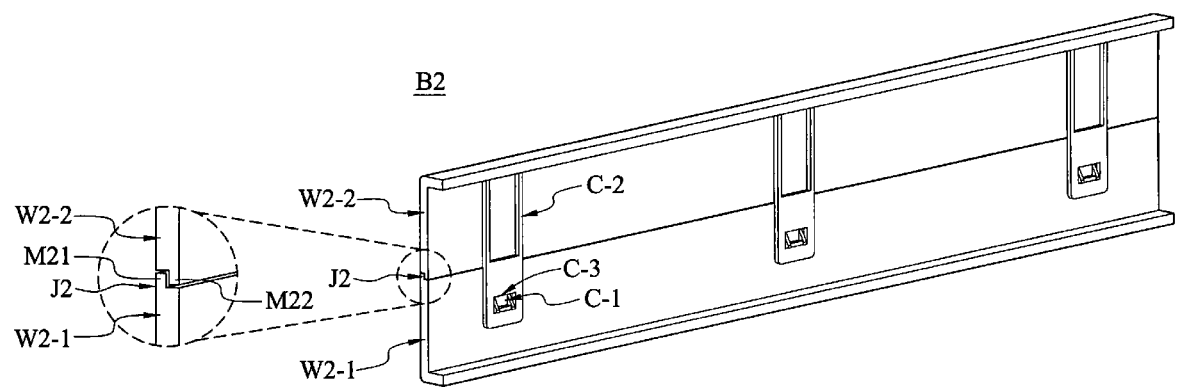
FIG. 3A is a partial perspective view of another conventional housing structure, and is cut away along a line T1—T1 of FIG. 1.
Figure 3B:
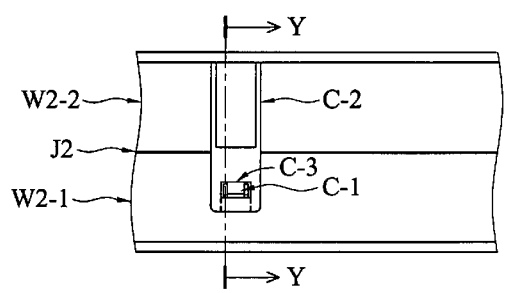
FIG. 3B is a partial side view of FIG. 3A.
Figure 3C:
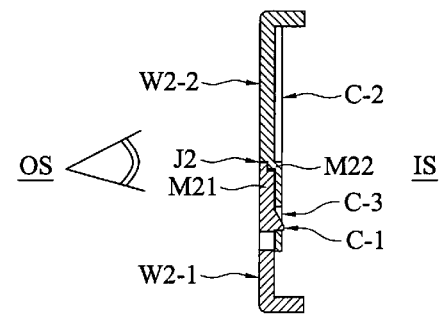
FIG. 3C and FIG. 3E are cross-sectional views along a line Y—Y of FIG. 3B.
Figure 3D:
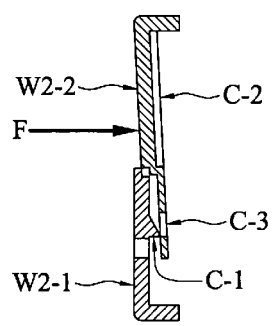
FIG. 3D is a schematic view of the housing structure in FIG. 3A being subjected to a force.
Figure 3E:
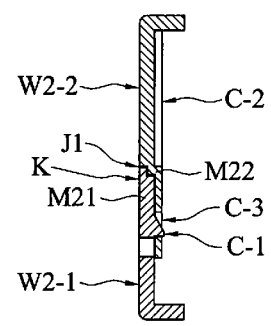
Figure 3F:
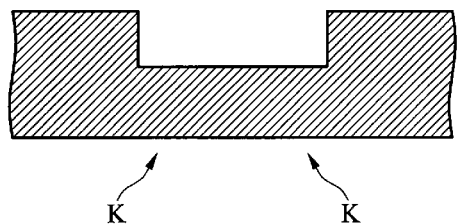
FIG. 3F is a schematic view of a product with a non-uniform appearance after injection molding.
Figure 4A:
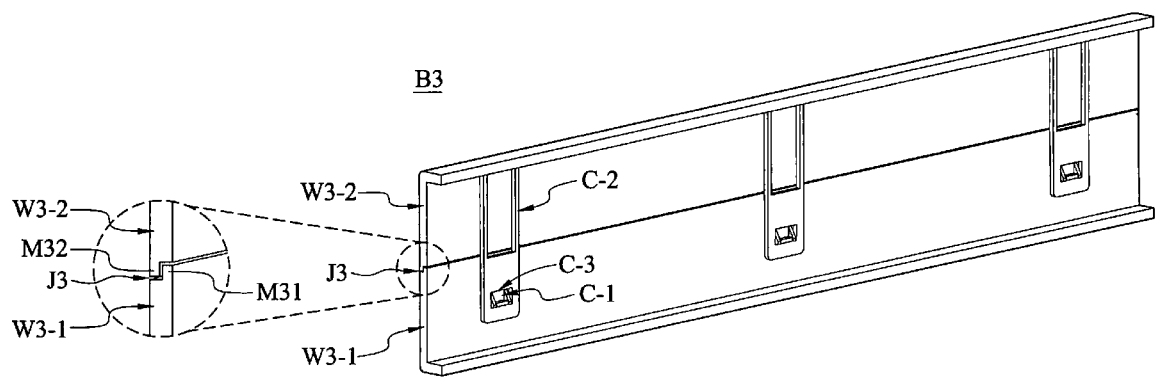
FIG. 4A is a partial perspective view of another conventional housing structure, and is cut away along a line T1—T1 of FIG. 1.
Figure 4B:
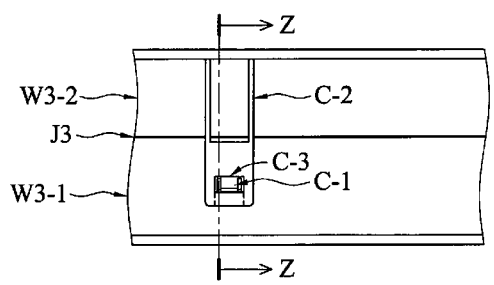
FIG. 4B is a partial side view of FIG. 4A.
Figure 4C:
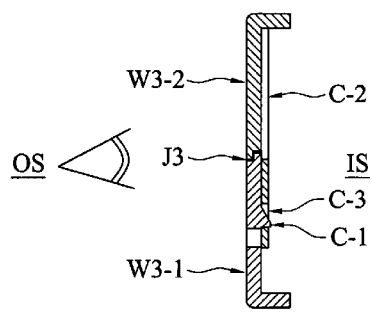
FIG. 4C and FIG. 4D are cross-sectional views along a line Z—Z of FIG. 4B.
Figure 4D:
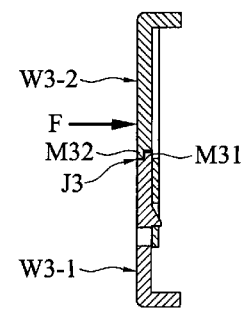
Figure 5:
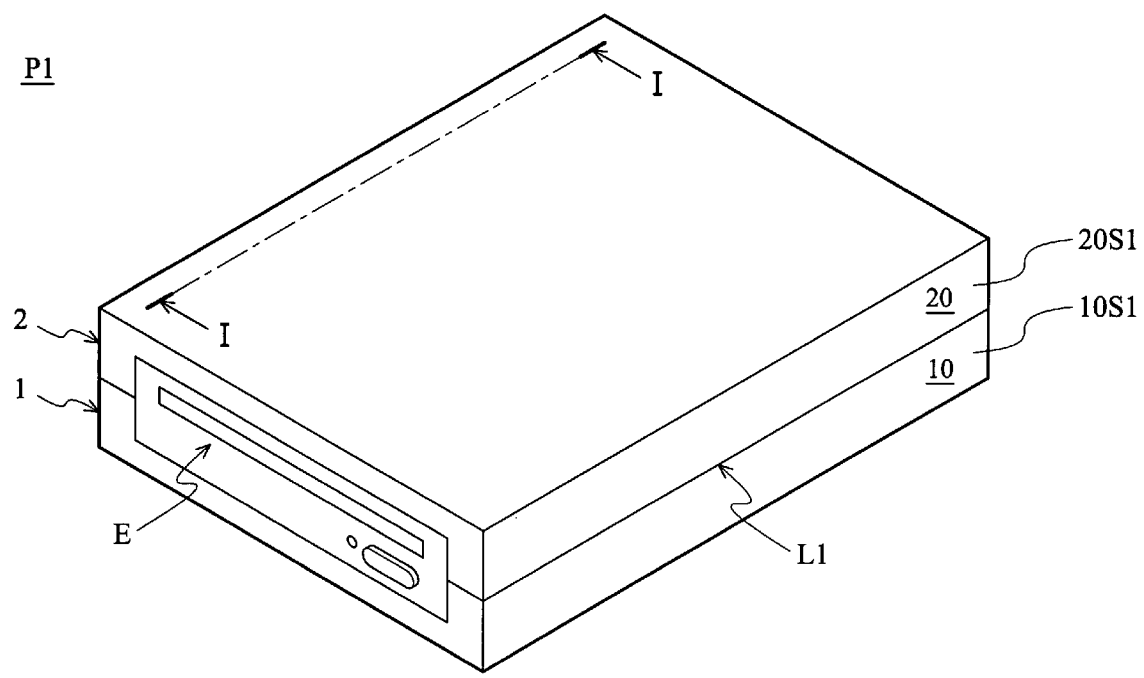
FIG. 5 is a perspective view of a housing structure as disclosed in a first embodiment of the invention.

Referring to FIG. 5, FIG. 5 is a perspective view of a housing structure P1 as disclosed in a first embodiment of this invention. The housing structure P1 receives an object E, such as a hard disc drive, an optical disc drive, or another electronic device, therein.

The housing structure P1 includes a first case 2 and a second case 1. A space is formed between the first case 2 and the second case 1. A joint region L1 is formed at a contact point between the first case 2 and the second case 1 after assembly.

Figure 6A:
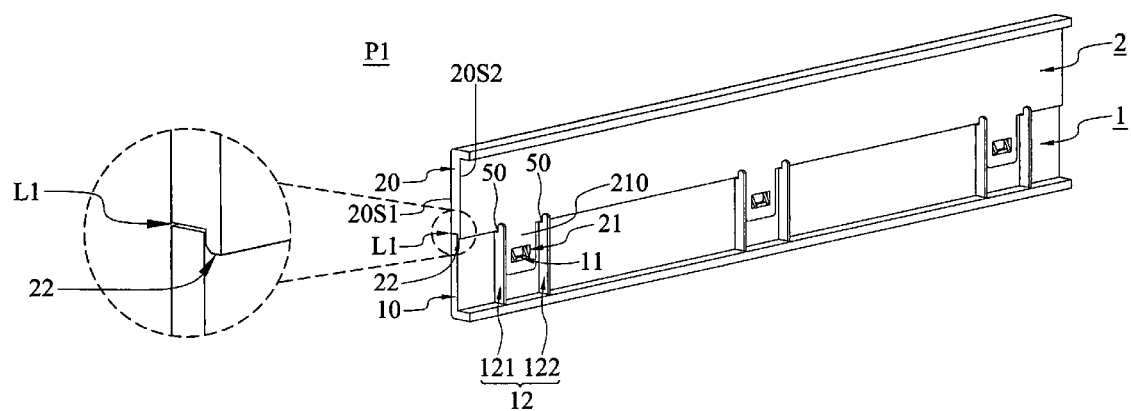
FIG. 6A is a partial perspective view of the housing structure in FIG. 5, and is cut away along a line I—I of FIG. 5.
Figure 6B:
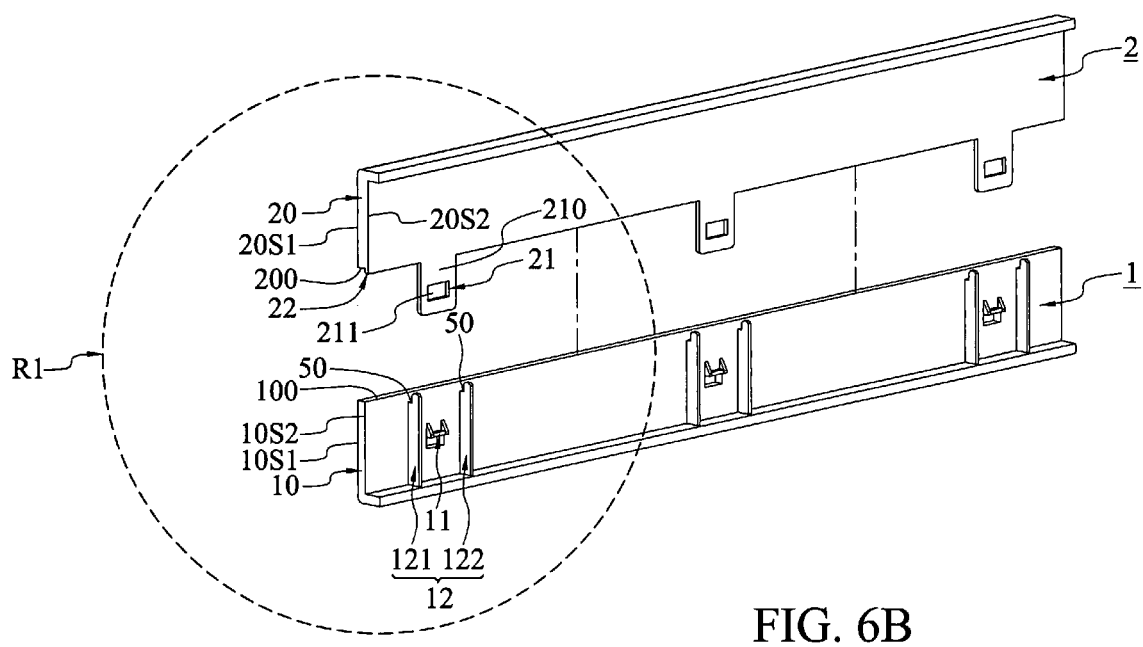
FIG. 6B is an exploded view of FIG. 6A.
Figure 6C:
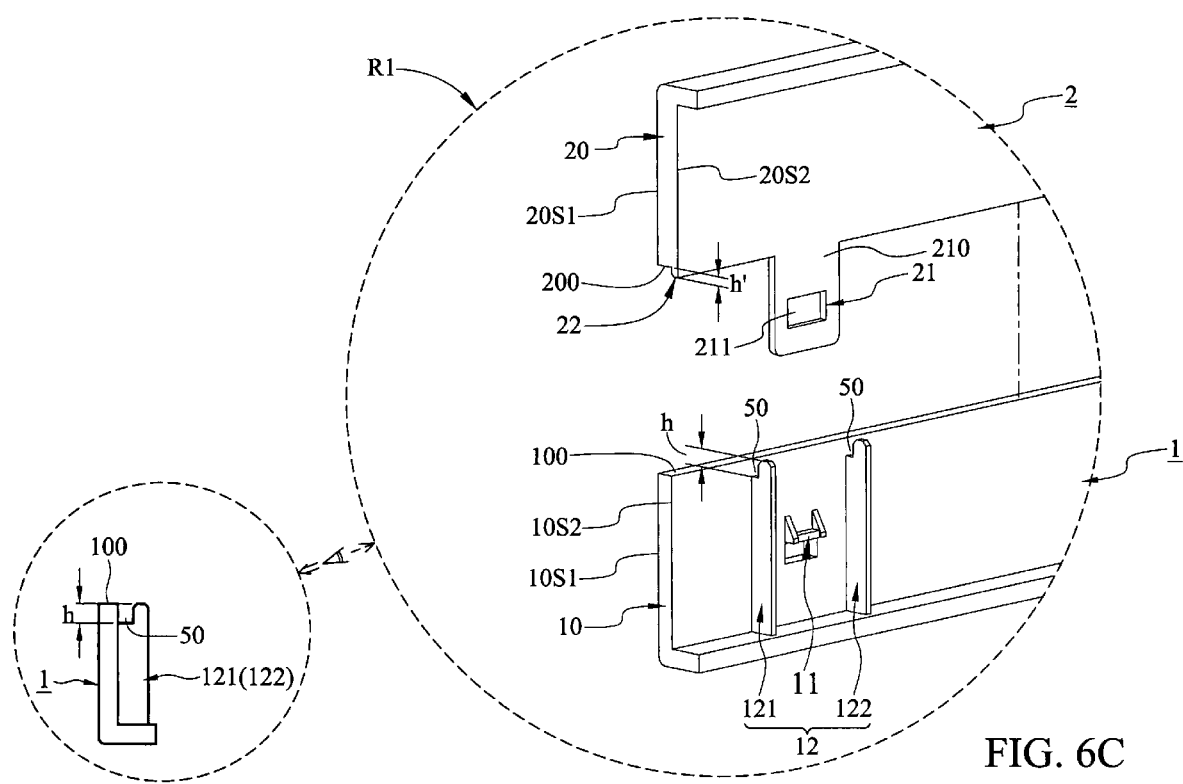
FIG. 6C is a partial enlarged view of a region R1 in FIG. 6B.

Referring to FIGS. 6A and 6B, FIG. 6A is a partial perspective view of the housing structure P1, and is cut away along a line I—I of FIG. 5. FIG. 6B is an exploded view of FIG. 6B, and FIG. 6C is a partially enlarged view of FIG. 6A.

As shown in FIG. 6B, the second case 1 includes a second wall 10, a plurality of second connecting portions 11, and a plurality of ribs 12, 121, 122. For example, each second connecting portion 11 may be a hook. The second wall 10 includes a second outer wall 10S1 and a second inner wall 10S2, and is provided with a uniform cross section. The second wall 10 includes an end surface 100 facing the first case 2. The second connecting portions 11 are disposed on the second inner wall 10S2 of the second wall 10, and are separate from each other. Also, the ribs 12 are disposed on the second inner wall 10S2 of the second wall 10, and are separate from each other.

In this embodiment, the second connecting portions 11 and the ribs 12 are integrally formed on the second wall 10. The second connecting portion 11 is disposed between the ribs 121, 122.

The first case 2 includes a first wall 20, plural first connecting portions 21, and an extension plate 22. The first wall 20 includes a first outer wall 20S1 and a first inner wall 20S2, and is provided with a uniform cross section. The first wall 20 includes an end surface 200 facing the second case 1. The first connecting portions 21 are separately disposed on the first inner wall 20S2 of the first wall 20, and are separate from each other. The extension plate 22 also extends from the end surface 200 of the first wall 200.

In this embodiment, each first connecting portions 21 includes a positioning plate 210 and a hole 211 formed on the positioning plate 210. The extension plate 22 is formed completely over the end surface 200 of the first wall 20. The first connecting portions 21 and the extension plate 22 are integrally formed on the first wall 20.

To join the first case 2 and the second case 1, the positioning plate 210 of the first case 2 is firstly guided into the space between the ribs 121, 122 of the second case 1. When the end surface 200 of the first case 200 is abutted by the end surface 100 of the second case 100, the first connecting portions 21 are engaged with the second connecting portions 11 so that the assembly of the housing structure P1 is complete. That is, when the second connecting portions 11 are joined with the first connecting portions 21, the extension plate 22 is abutted by the second inner wall 10S2.

As shown in FIG. 6C, the length of the extension plate 22 is h. A notch 50 is formed between the rib 12 and the second inner wall 10S2, and the depth of the notch 50 is h. When the first case 2 is joined with the second case 1, the extension plate 22 is positioned in the notch 50. Thus, the extension plate 22 contacts the notch 50, and does not move as a result of deposition. That is, the force F' as shown in FIG. 6E cannot affect the combination of the first case 2 and the second case 1.

Referring to FIG. 6D and FIG. 6E, FIG. 6D is a partial side view of FIG. 6A, and FIG. 6E is a cross-sectional view along a line A—A of FIG. 6D.

In FIG. 6E, subsequent to assembly of the housing structure P1, the end surface 200 of the first case 2 is abutted by the end surface 100 of the second case 1. The housing structure P1 is divided into the inner space IS and the outer space OS by the second wall 10 of the second case 1 and the first wall 20 of the first case 2. The object E as shown in FIG. 5 is received in the inner space IS.

Due to the deposition of the extension plate 22 of the first case 2, the structure inside the housing structure P1 cannot be seen from the joint region L1. In addition, when the second wall 10 of the second case 1 is subject to an external force, the second wall 10 cannot be moved toward the inner space IS by the second connecting portions 11, the first connecting portions 21, and the extension plate 22. Thus, the second case 1 cannot be accidentally separated from the first case 2. When the first wall 20 of the first case 2 is subjected to the external force F', the first wall 20 cannot be moved toward the inner space IS by the second connecting portions 11, the first connecting portions 21, and the ribs 12, 121, 122.

In addition, as shown in FIG. 6E, each first wall 20 and second wall 10 is substantially provided with a uniform cross section respectively. The thickness of extension plate 22 is relatively smaller than that of the first wall 20. Thus, during injection molding, an outer surface 20S1 of the first wall 20 does not present a non-uniform appearance thereon. Also, an outer surface 10S1 of the second wall 10 does not present a non-uniform appearance thereon.

Second Embodiment

Figure 7:
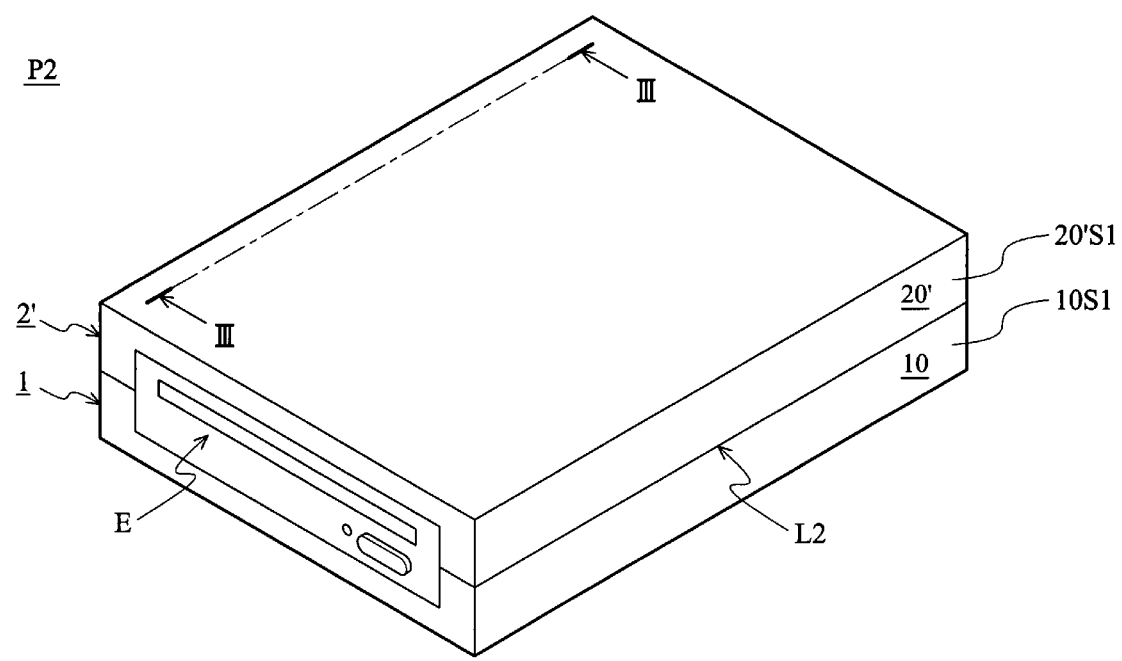
FIG. 7 is a perspective view of a housing structure as disclosed in a second embodiment of the invention.

FIG. 7 is a perspective view of a housing structure P2 as disclosed in a second embodiment of the invention. The housing structure P2 includes a first case 2' and a second case 1, and receives the object E therein.

The first case 2' of the housing structure P2 is different from the first case 2 of the housing structure P1. The second case 1 of the housing structure P2 is the same as that of the housing structure P1, its description is omitted.

Figure 8A:
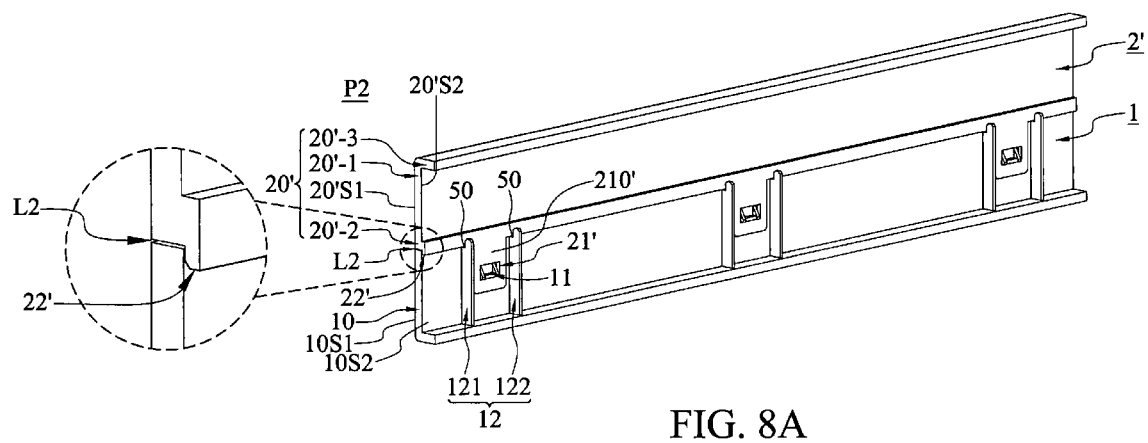
FIG. 8A is a partial perspective view of the housing structure in FIG. 7, and is cut away along a line III—III of FIG. 7.
Figure 8B:
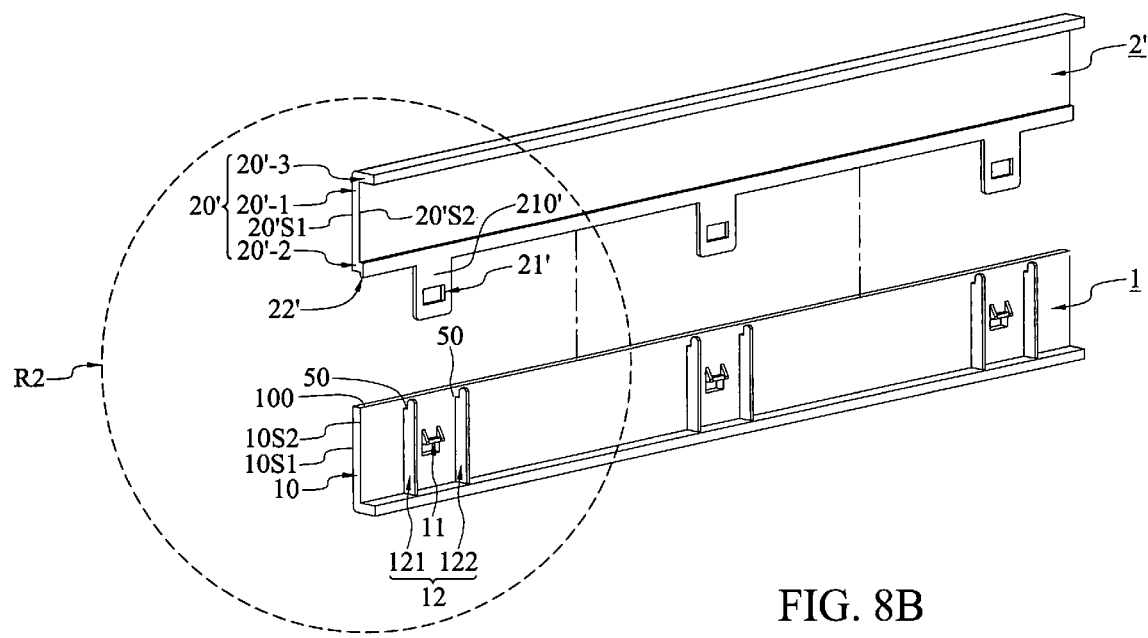
FIG. 8B is an exploded view of FIG. 8A.

Referring to FIGS. 8A and 8B, FIG. 8A is a partial perspective view of the housing structure P2 in FIG. 7, and is cut away along a line III—III of FIG. 7. FIG. 8B is an exploded view of FIG. 8A;

In FIG. 8B, the first case 2' includes a second wall 20', plural first connecting portions 21' and an extension plate 22'. The first wall 20' includes a main plate 20'-1 and a top plate 20'-3, and is provided with a first inner wall 20"S1 and a first outer wall 20'S2. The main plate 20'-1 is provided with a uniform cross section, and is formed with a Z-shaped end surface 20'-2. The extension plate 22 is formed on the Z-shaped end surface 20'-2, and the length of the extension plate 22 is h. The first connecting portions 21' are separately disposed on the first inner wall 20'S2 of the first wall 20', and are separate from each other.

Figure 8C:
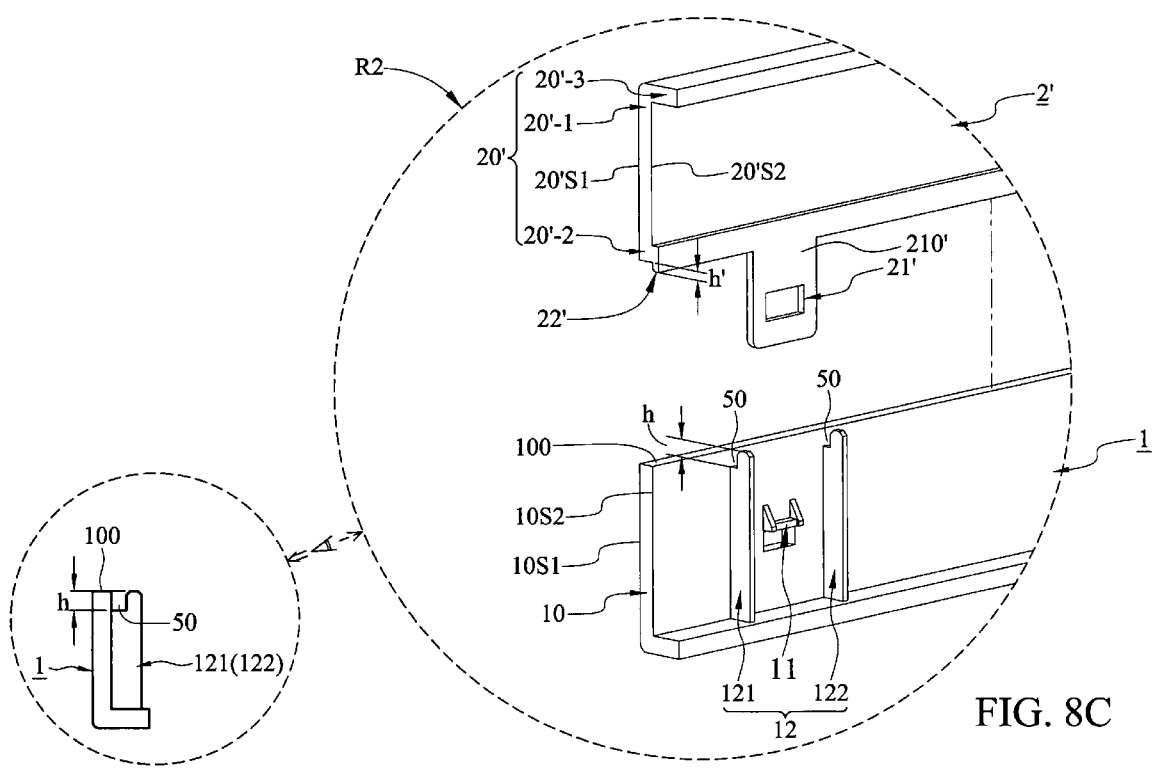
FIG. 8C is a partial enlarged view of a region R2 in FIG. 8B.

Referring to FIGS. 8C and 8D, FIG. 8C is a partial side view of FIG. 8A, and FIG. 8D is a cross-sectional view along a line B—B of FIG. 8C.

In FIG. 8D, after the assembly of the housing structure P2, the end surface 20'-2 of the first case 2' is abutted by the end surface 100 of the second case 1. The housing structure P2 is divided into the inner space IS and the outer space OS by the second wall 10 of the second case 1 and the first wall 20' of the first case 2'.

Due to the deposition of the extension plate 22' of the first case 2', the structure inside the housing structure P2 cannot be seen from the joint region L2. In addition, when the second wall 10 of the second case 1 is subjected to an external force, the second wall 10 cannot be moved toward the inner space IS by the second connecting portions 11, the first connecting portions 21', and the extension plate 22'. Thus, the second case 1 cannot be accidentally separated from the first case 2'. When the first wall 20' of the first case 2' is subjected to the external force F', the first wall 20' cannot be moved toward the inner space IS by the second connecting portions 11, the first connecting portions 21', or the ribs 12, 121, and 122.

As shown in FIG. 8D, the first wall 20' is substantially provided with a uniform cross section. The thickness of extension plate 22' is relatively smaller than that of the first wall 20'. Thus, during injection molding, an outer surface 20'S1 of the first wall 20 does not present a non-uniform appearance. Also, an outer surface 10S1 of the second wall 10 does not present a non-uniform appearance.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A housing structure comprising:
    a first case including a first inner wall with an extension plate, wherein the length of the extension plate is h; and
    a second case including a second inner wall with a rib, wherein a notch is defined between the rib and the second inner wall, and the depth of the notch is h;
    wherein the extension plate engages the notch when the first case is joined with the second case.

2. The housing structure as claimed in claim 1, wherein the first inner wall includes an end surface and the extension plate extends from the end surface.

3. The housing structure as claimed in claim 1, wherein the first case further includes a first connecting portion, the second case further includes a second connecting portion, and the first connecting portion is joined with the second connecting portion in a separable manner when the first case is joined with the second case.

4. The housing structure as claimed in claim 1, wherein the extension plate is integrally formed on the first inner wall.

5. The housing structure as claimed in claim 1, wherein the rib is integrally formed on the second inner wall.

6. The housing structure as claimed in claim 1, wherein the first case is substantially provided with a uniform cross section.

7. The housing structure as claimed in claim 1, wherein the second case is substantially provided with a uniform cross section.

8. The housing structure as claimed in claim 3, wherein the first connecting portion is integrally formed on the first inner wall.

9. The housing structure as claimed in claim 3, wherein the second connecting portion is integrally formed on the second inner wall.

10. The housing structure as claimed in claim 3, wherein the first connecting portion includes a positioning plate and a hole formed on the positioning plate.

11. A housing structure comprising:
    a first case including a first inner wall with a Z-shaped end surface, wherein an extension plate is formed on the Z-shaped end surface, and the length of the extension plate is h; and
    a second case including a second inner wall with a rib, wherein a notch is defined between the rib and the second inner wall, and the depth of the notch is h;
    wherein the extension plate engages the notch when the first case is joined with the second case.

12. The housing structure as claimed in claim 11, wherein the first case further includes a first connecting portion, the second case further includes a second connecting portion, and the first connecting portion is joined with the second connecting portion in a separable manner when the first case is joined with the second case.

13. The housing structure as claimed in claim 11, wherein the extension plate is integrally formed on the first inner wall.

14. The housing structure as claimed in claim 11, wherein the rib is integrally formed on the second inner wall.

15. The housing structure as claimed in claim 11, wherein the first case is substantially provided with a uniform cross section.

16. The housing structure as claimed in claim 11, wherein the second case is substantially provided with a uniform cross section.

17. The housing structure as claimed in claim 12, wherein the first connecting portion is integrally formed on the first inner wall.

18. The housing structure as claimed in claim 12, wherein the second connecting portion is integrally formed on the second inner wall.

19. The housing structure as claimed in claim 12, wherein the first connecting portion includes a positioning plate and a hole formed on the positioning plate.

* * * * *